Oct. 25, 1949.  F. E. FREY  2,486,368
HF-BF$_3$-H$_2$O ISOMERIZATION CATALYST
Original Filed Nov. 23, 1943
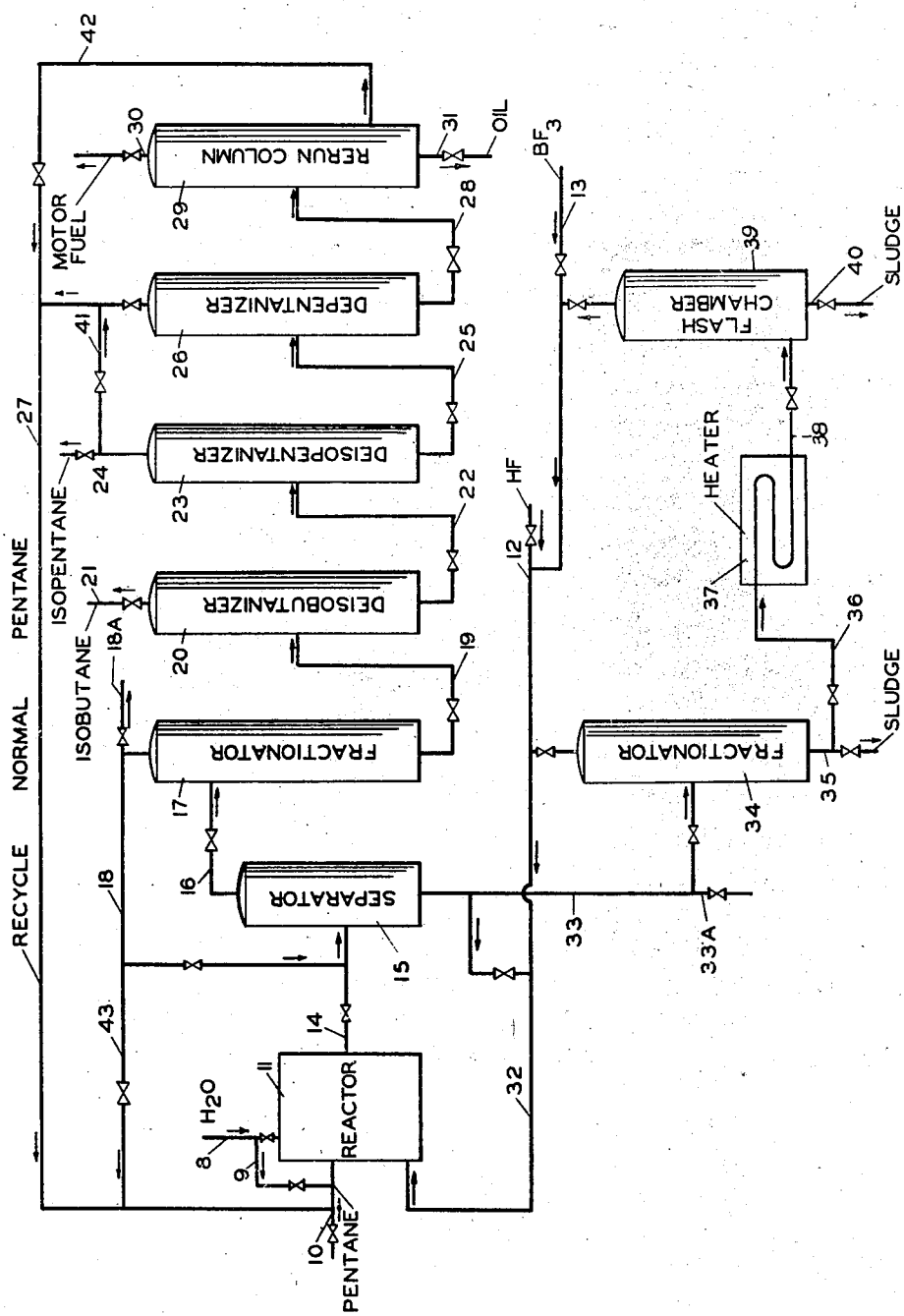
INVENTOR
FREDERICK E. FREY
BY Hudson and Young
ATTORNEYS Patented Oct. 25, 1949

2,486,368

UNITED STATES PATENT OFFICE 2,486,368

HF-BF₃-H₂O ISOMERIZATION CATALYST

Frederick E. Frey, Bartlesville, Okla., assignor to Phillips Petroleum Company, a corporation of Delaware Original application November 23, 1943, Serial No. 511,444. Divided and this application February 11, 1946, Serial No. 646,735

2 Claims. (Cl. 252—433)

This invention relates to the reconstruction of hydrocarbons. In a specific embodiment it relates to the reconstruction of saturated hydrocarbons in the presence of a catalyst comprising a major proportion of concentrated hydrofluoric acid and a minor proportion of boron fluoride. This application is a divisional application of my copending application Serial No. 511,444, filed November 23, 1943, now U. S. 2,461,541, which in turn is a continuation-in-part of my copending application Serial No. 460,867, now U. S. 2,461,540, filed on October 5, 1942, which in turn is a continuation-in-part of my copending application Serial No. 426,627, filed January 13, 1942, now Patent 2,403,649, issued July 9, 1946. This latter application is in turn a continuation-in-part of my application Serial No. 323,443, filed March 11, 1940, now Patent 2,317,901, issued April 27, 1943.

The aforementioned earlier applications disclose that, in the presence of substantial proportions of hydrofluoric acid and under suitable conditions of time and temperature, saturated hydrocarbons are reconstructed to hydrocarbons of different carbon-skeleton arrangement and different boiling point. Paraffinic hydrocarbons, for example, undergo conversion to isomers and also undergo conversion to hydrocarbons of both lower and higher molecular weights and correspondingly lower and higher boiling temperatures. I have found a marked improvement in the efficiency and utility of concentrated hydrofluoric acid as a catalyst for reconstructing hydrocarbons is brought about by including with it a minor proportion of boron fluoride.

An object of this invention is to improve concentrated hydrofluoric acid as a catalyst for reconstructing hydrocarbons.

Another object of this invention is to provide an improved catalytic process for isomerizing normal butane to isobutane.

Another object of this invention is to produce isobutane, isopentane, and isohexanes from normal pentane.

Another object of this invention is to produce isobutane and isohexanes from isopentane.

A further object of my invention is to effect a catalytic conversion of hydrocarbons.

Another object is to obtain a hydrocarbon conversion of a drastic type, with fracture of the carbon skeleton and with consumption of only low and economical amounts of BF₃ as well as HF.

Still another object of my invention is to reduce the formation of sludge in the reconstruction of hydrocarbons using hydrogen fluoride as the catalyst.

Other objects and advantages of this invention will become apparent, to one skilled in the art, from the accompanying disclosure and discussion.

The present invention comprises treating hydrocarbons, preferably saturated hydrocarbons such as the paraffins and cycloparaffins, with concentrated hydrofluoric acid, which contains, or which has had added to it, a minor proportion of boron fluoride to produce other hydrocarbons. By various modifications of my invention I can convert paraffin hydrocarbons to other paraffin hydrocarbons isomeric with the paraffins treated; I can convert paraffin hydrocarbons to other paraffin hydrocarbons having more and/or fewer carbon atoms per molecule; and I can convert cycloparaffins to other cycloparaffins having different alkyl groups and/or a different number of carbon atoms in the ring. In carrying out my invention it appears that two types of reaction occur. One of these reactions is true isomerization as when normal butane is converted to isobutane, normal pentane to isopentane, methylcyclopentane to cyclohexane and the like, and also the reverse of these reactions. The other reaction which appears to be involved is primarily one of disproportionation as when normal pentane is converted to more or less equimolar amounts of butanes and hexanes with the iso compounds generally predominating. In many instances these two types of reactions take place concurrently with the formation of products which include isomers of the original hydrocarbons treated and hydrocarbons having fewer and greater numbers of carbon atoms per molecule. However, in most cases the reaction conditions may be controlled, particularly with the inclusion of modifying agents, to vary the ratio of these reaction types. The process is directed primarily to converting low-boiling saturated hydrocarbons having at least four carbon atoms per molecule and boiling below about 450° F., although at times saturated hydrocarbons boiling outside this range may be treated.

The different types of reactions which are believed to be involved in the reconstruction of saturated hydrocarbons in accordance with my invention may be exemplified as follows:

(1)      2C₅H₁₂ ⇌ C₆H₁₄ + C₄H₁₀
         (pentanes) (hexanes) (butanes)

(2)      (a) n-heptane ⇌ branched heptanes
         (b) n-butane ⇌ isobutane (3)      C₆H₁₂ ⇌ CH₃C₅H₉
         (cyclohexane) (methylcyclopentane)

Although several other types of reaction probably also take place in the reconstruction process, the above-mentioned types appear to account for most of the effects which are produced. The general term "reconstruction" is used herein to denote the production of one or more of the above-mentioned effects and/or other advantageous effects which result from the practice of my invention.

The catalyst employed in the practice of my invention comprises a major proportion of hydrofluoric acid modified or activated by a minor proportion of boron trifluoride. No nickel or other catalytic agent is required, and in many cases the reactions may be carried out at normal atmospheric temperature or at a temperature only somewhat higher than atmospheric temperature. In its preferred form my catalyst comprises a homogeneous liquid solution of boron fluoride in a large excess of liquid hydrofluoric acid. In determining the so-called "K constants" of solutions of boron trifluoride in liquid anhydrous hydrofluoric acid it has been determined that there appears to be primarily a true solution of boron trifluoride in the liquid hydrofluoric acid. However, an induction period has been observed which, in certain instances, has been eliminated by the addition of reactive hydrocarbons, such as olefins. Also, complexes between hydrocarbons and the catalyst ingredients have been found in the catalyst phase after use. In a still further preferred modification of my invention I include in this catalytic mixture a small amount of water since, as will be shown hereinafter by data obtained in making comparative runs, the use of strictly anhydrous hydrofluoric acid and a minor amount of boron trifluoride as the catalyst is attended with the formation of an appreciable amount of organic sludge. This sludge does not make the use of an anhydrous catalyst impractical or uneconomical but, as can readily be appreciated, is undesirable. I have now found that when the catalyst is not strictly anhydrous, but contains a small amount of water, there is a much smaller amount of sludge formed and at times the amount of sludge is practically negligible.

An understanding of various aspects of my invention may be aided by referring to the accompanying drawing and the following discussion thereof. The drawing is a schematic flow diagram showing one arrangement of apparatus which may be used in the practice of one embodiment of the invention. In order that the discussion may be sufficiently specific to be clear the embodiment discussed will be limited to the reconstruction of normal pentane, which will include both isomerization to form isopentane and disproportionation to form butanes and hydrocarbons having more than five carbon atoms per molecule which will be primarily hexanes. However, by suitably controlling the reaction conditions, particularly by adding modifiers such as free hydrogen, cycloparaffins and the like, the reaction can be controlled to effect increased amounts of isomerization at the expense of disproportionation. As will be appreciated, the invention may also be applied to other saturated hydrocarbons as herein discussed.

Referring now to the drawing, normal pentane, preferably in the liquid phase, is introduced through inlet 10 to reactor 11. Concentrated hydrofluoric acid is introduced through inlet 12 and conduit 32, also preferably in the liquid phase, and a minor amount of boron trifluoride is introduced through inlet 13 and passes through conduits 12 and 32 to reactor 11. Although it is not definitely established that the reactions will not take place with both the hydrocarbons and catalyst in vapor phase, it is known to be definitely preferable to have at least the catalyst in liquid phase, and it is also preferable to have both the catalyst and the hydrocarbon material in liquid phase. The proportion of boron trifluoride should be such as to be present to the extent of at least about 0.1 per cent by weight of the hydrofluoric acid. Although the amount of boron trifluoride may be as much as about 20 to 30 per cent by weight of the hydrofluoric acid, I have found that little benefit is to be derived from having the amount greater than about 10 per cent by weight. In most instances satisfactory and efficient operation is obtained when the amount of boron trifluoride is between about 1 and about 5 per cent by weight. Such a composition is a very active catalyst, particularly for treating pentanes and heavier hydrocarbons at about atmospheric temperature, while at the same time the amount of boron trifluoride present is sufficiently low that excessive costs for replacing and regenerating the catalyst are not incurred, and that excessive pressures are not necessary in order to keep a liquid phase operation, and further extensive corrosion of the usual materials for construction of the reaction vessels such as ordinary steels is not unduly high. Substantially more drastic reaction conditions are necessary in effecting the reconstruction of butane and successful operation is generally obtained only by using a somewhat higher proportion of boron trifluoride together with somewhat higher temperatures and longer reaction times. In many instances the proportion of boron trifluoride which is used will be to some extent correlated with the other reaction conditions and in general a lower reaction temperature may be used with somewhat higher concentrations of boron trifluoride and also a shorter reaction time will be satisfactory with somewhat higher concentrations of boron trifluoride.

As previously mentioned a small amount of water is also employed to obtain the most satisfactory operation. This water may be added directly to reactor 11 through conduit 8, or may be added at least in part to the hydrocarbon charge by means of conduit 9 which leads from conduit 8 to conduit 10. Although the necessary amount of water can be included in the hydrofluoric acid introduced through conduit 12, the other manner of operation is preferred. Often a satisfactory amount of water can be maintained in the reaction system after the operation has started by partially or completely saturating the liquid hydrocarbon material charged through conduit 10 with dissolved water. The concentration of water in the reactor should be at least about 0.05 per cent by weight of the hydrofluoric acid-boron fluoride catalyst and generally need not exceed about 1.0 per cent by weight, although in some instances higher concentrations may be found to be desirable. However, the amount of water used should not exceed the molecular equivalent of boron trifluoride present since it appears that the water immediately disappears as such through the formation of a complex with the boron trifluoride, and an appreciable amount of free boron trifluoride must be present to effect the reconstruction reactions at a desirably rapid rate in the preferred temperature range. With added water the amount of boron trifluoride present in excess of that molecularly equivalent to the water should be within the ranges hereinbefore discussed, namely at least about 0.1 per cent by weight and preferably about 1 to about 5 per cent by weight, or somewhat more in some instances. When the reaction is carried out in a long reaction zone of restricted cross-sectional area, as in a tube coil, it may be found desirable to add water and/or boron trifluoride at various points along the length of the reaction zone. The relative proportions of catalyst and hydrocarbon are within a wide range not greatly critical. Good results are obtained using a hydrocarbon to catalyst weight ratio in the range of about 0.1:1 to 3:1 or more, and preferably this ratio should be within the range of about 0.5:1 to 1.5:1. In any event it is desirable to operate under conditions of temperature, pressure and concentration such that an appreciable amount of a liquid hydrofluoric acid phase is present in the reaction zone. The catalyst and the hydrocarbon reactants should be brought into and maintained in intimate contact, and preferably such contact is effected by mechanical mixing resulting in substantial emulsification of the two phases. This may be done by means of a mixing pump, by passing the mixture at a high velocity through a series of baffles, by injecting the hydrocarbon charge at a high velocity through a jet into a body of the reaction mixture, by recirculation, or the like as can be readily effected by one skilled in the art.

While the reaction temperature may be within a rather wide range as between about 0 and about 400° F., satisfactory operation is generally obtained within a much narrower range, and suitably rapid reaction velocities have been secured at temperatures within the range of about 50 to about 250° F. With other reaction conditions constant the reaction rate is slower at low temperatures than at high temperatures and the rate of spending of the catalyst and the extent of secondary reaction and degradation of the product is greater at higher temperatures than at lower temperatures. As previously mentioned, with other reaction conditions constant the rate of the reactions are somewhat greater with higher concentrations of boron trifluoride than with lower concentrations, although in most instances satisfactorily rapid reaction rates are obtained when the concentration of free boron trifluoride is not greater than about 5 per cent by weight. The reconstruction of normal butane and also of normal hexane appears to require appreciably more drastic reaction conditions than those at which can be satisfactorily used when treating normal pentane.

With other reaction conditions constant the optimum reaction time varies in general more or less inversely with the reaction temperature. For temperatures within the above-mentioned preferred ranges a satisfactory reaction time will generally be found within the range of about 5 to about 60 minutes. With very short times in reaction the conversion is relatively incomplete so that large amounts of unreacted material are made and in continuous operations there is an unnecessarily heavy load on subsequent separating and recycling equipment. If the reaction time is excessively long secondary reactions become involved to an undesirable extent and the life of the catalyst in terms of quantity of product per unit quantity of catalyst is excessively short. Satisfactory operations have been obtained with a correlation of the reaction conditions to give as high as 70 to 90 per cent conversion per pass in the reconstruction of normal pentane, and as high as 60 to 80 per cent per pass for reconstructing isopentane. However, economical operations can be realized with appreciably lower conversions per pass in many instances.

The reactions are not greatly affected by pressure, but, as previously mentioned, it is preferred to have the catalyst and reactants in liquid phase in the reaction zone; a pressure sufficient to insure this, at the reaction temperature, is usually satisfactory as a reaction pressure.

The reaction mixture passes from reactor 11 through conduit 14 to separator 15 wherein it is separated into two liquid phases as by gravitational settling. Cooling means not shown may also be employed to aid in the separation and the use of other devices such as centrifuges may also be included. The lighter or hydrocarbon phase, which contains a small proportion of hydrofluoric acid and boron trifluoride dissolved in the mixture in conduit 14, is passed through conduit 16 to fractionator 17. From fractionator 17 a mixture of low-boiling hydrocarbons containing small amounts of hydrogen fluoride and boron trifluoride, is removed as an overhead product and may be recycled to separator 15 and/or may be passed through conduit 43 to reactor 11. In the event low-boiling hydrocarbons, such as methane, ethane and/or propane, tend to accumulate in the system a portion or all of this fraction may be removed through conduit 18A and may be treated to recover and recycle to the system desired constituents. Hydrocarbon material, free from dissolved hydrofluoric acid, is passed from the bottom of fractionator 17 through conduit 19 to deisobutanizer 20, wherefrom isobutane is distilled overhead and is withdrawn through outlet 21. Hydrocarbon material is passed from the bottom of deisobutanizer 20 through conduit 22 to deisopentanizer 23, wherefrom isopentane is distilled overhead and is withdrawn through outlet 24. At least a part of this material may be passed, if desired, back to reactor 11 from conduit 24 through conduits 41 and 27. Hydrocarbon material from the bottom of deisopentanizer 23 is passed through conduit 25 to depentanizer 26, wherefrom normal pentane is distilled overhead and is recycled through conduit 27 to reactor 11. Isohexanes and other normally liquid hydrocarbons are passed from the bottom of depentanizer 26 through conduit 28 to rerun column 29, wherefrom a major fraction suitable for blending in motor fuel is distilled overhead and is withdrawn through outlet 30. This fraction may be subjected to further fractionation and purification, if desired. A minor fraction of relatively high boiling material is withdrawn through outlet 31. A fraction of intermediate boiling range may, if desired, be removed through conduit 42 and passed to conduit 27 and reactor 11.

A heavier catalyst phase is recovered from separator 15 and is recycled at least in part through conduit 32 to reactor 11. Although with the use of a small amount of water, as hereinbefore discussed, the amount of sludge formation is quite small, with prolonged continuous operation it will be found desirable to subject a portion of the catalyst to purification and/or regeneration treatment and for this purpose a portion of it is passed from separator 15 through conduit 33 to purification equipment illustrated by fractionator 34. From fractionator 34 a substantially purified hydrofluoric acid is removed as an overhead product and is recycled through conduit 32 to reactor 11. This fraction will also contain the free boron trifluoride contained in the catalyst passed to the fractionator and will contain most, if not all, of the low-boiling hydrocarbons which are dissolved in the catalyst.

High-boiling material may be withdrawn through outlet 35; preferably however, it is passed through conduit 36 to heater 37. Heater 37 heats the material to a temperature in the range of about 100 to 600° F., usually more preferably in the range of about 350 to 500° F., whereupon fluoroorganic materials are decomposed, liberating HF. Some boron fluoride is also liberated. The heated and decomposed material then passes through conduit 38 to flash chamber 39, wherefrom hydrofluoric acid and boron fluoride are withdrawn overhead, and recycled through conduit 32 to reactor 11, and a high-boiling residue or sludge is withdrawn through outlet 40. Hydrogen fluoride may be introduced to conduit 36 and/or chamber 39 during the decomposition of the high-boiling catalyst complex and polymer to increase the amount of $BF_3$ released in molecular form.

It will be appreciated that the drawing is only diagrammatic, and that suitable specific equipment for the practice of any modification of my invention may be readily designated and designed by one skilled in the art. Although the description of the drawing has been limited primarily to a description and discussion of the reconstruction of normal pentane, the same principles which are involved may be readily applied to a reconstruction of other specific saturated hydrocarbons or hydrocarbon fractions, such as fractions secured from natural or straight-run gasolines, particularly the recycle of fractions of higher and/or lower boiling points, or ranges, than the hydrocarbon material in the net charge.

A few of the many aspects of my invention are illustrated by the following examples, which are illustrative but not necessarily limitative of the invention.

Example I

A series of test runs for reconstructing hydrocarbons were made in a closed 18-liter steel reactor having a motor driven stirrer. The procedure was to charge predetermined quantities of anhydrous hydrofluoric acid, boron fluoride and hydrocarbon material to the reactor, to adjust the reaction temperature by means of a heated water or oil bath surrounding the reactor, to stir the mixture for a suitable reaction time, to withdraw the reaction mixture, to separate the hydrocarbon products from the catalyst, and to determine the composition and properties of the products. The following data were obtained:

| Test No. | 1 | 2 | 3 | 4 | 5 | 6 |
|---|---|---|---|---|---|---|
| Hydrocarbon charge | n-pentane | n-pentane | n-pentane | iso-pentane | n-butane | n-butane |
| $BF_3$, weight per cent of HF | 2.7 | 2.9 | 3.5 | 3.8 | 2.8 | 3.3 |
| Temperature, °F | 77-90 | 106-115 | 73-165 | 122-126 | 138-144 | 151-174 |
| Time, min | 34 | 19 | 10 | 225 | 48 | 45 |
| Composition of product, weight per cent: | | | | | | |
| Propane | 0 | 0 | 2.1 | 1.1 | 0 | 0 |
| Isobutane | 24.3 | 31.0 | 36.1 | 34.2 | 4.8 | 10.8 |
| N-butane | 1.2 | 3.2 | 9.9 | 6.7 | 95.2 | 88.7 |
| Isopentane | 19.1 | 20.4 | 20.9 | 20.5 | | |
| N-pentane | 29.8 | 15.5 | 5.8 | 3.7 | 0 | 0.5 |
| Hexanes and heavier | 25.6 | 29.9 | 25.2 | 33.8 | | |
| | 100.0 | 100.0 | 100.0 | 100.0 | 100.0 | 100.0 |
| Total Conversion, weight per cent | 70.2 | 84.5 | 94.2 | 79.5 | 4.8 | 11.3 |
| Composition of hexanes and heavier, volume per cent: | | | | | | |
| Neohexane | 12 | | 12 | 25 | | |
| Diisopropyl | | | | 5 | | |
| Other hexanes | 46 | | 38 | 31 | | |
| Heptanes | 23 | | 25 | 18 | | |
| Octanes | 8 | | 11 | 10 | | |
| Heavier | 11 | | 14 | 11 | | |
| | 100 | | 100 | 100 | | |
| Pentane free aviation fraction (336°F. cut point): | | | | | | |
| Yield, volume per cent hexanes and heavier | 97.6 | 95.2 | 97.3 | 97.9 | | |
| Gravity, A. P. I. | 78.0 | 72.2 | 76.6 | 77.9 | | |
| Octane No., A. S. T. M.: | | | | | | |
| Clear | 71.8 | 71.8 | 68.0 | 73.8 | | |
| 1 cc. TEL | 85.8 | 85.8 | | 87.7 | | |

It is evident from this data that my invention is broadly applicable to the conversion of paraffin hydrocarbons to isomers and/or to hydrocarbons of higher and/or lower molecular weights. Recycling of undesired products may be employed to increase the ultimate yield of desired products.

Example II

In another test run, normal hexane and concentrated hydrofluoric acid to which has been added 5.2 weight per cent boron fluoride were shaken together in a closed steel pressure vessel for 40 minutes. The temperature was maintained at 180° F. by an electric heater. The resulting hydrocarbon material was found to have the following composition:

| Hydrocarbon: | Weight percent |
|---|---|
| Butanes | 0.5 |
| Pentanes | 0.6 |
| Neohexane | 6.5 |
| Diisopropyl | 7.9 |
| 2-methylpentane | 24.9 |
| 3-methylpentane | 10.5 |
| Normal hexane | 41.5 |
| Heptanes and octanes | 6.2 |
| Heavier | 1.4 |
| | 100.0 |

The total conversion in this run was 58.5 per cent of the original normal hexane. It is evident that the principal reaction occurring in this test run was isomerization of normal hexane to isohexanes including neohexane and diisopropyl. It is further evident from this test run that my invention, in one of its modifications, may be applied to the production of high yields of neohexane and diisopropyl from less highly-branched hexanes. Such a modification comprises reconstructing normal hexane and/or methylpentanes in the presence of concentrated hydrofluoric acid containing a minor proportion of boron fluoride, separating neohexane and/or diisopropyl from the resulting reconstructed hydrocarbon material, and recycling other hexanes and heavier hydrocarbons to the reconstructing step.

*Example III*

In another test run, normal hexane was reconstructed under conditions similar to those of Example II except that the temperature was 260° F. and the time was 35 minutes. The resulting hydrocarbon was found to have the following composition:

| Hydrocarbon: | Weight Percent |
|---|---|
| Propane | 13.8 |
| Isobutane | 27.6 |
| N-butane | 9.0 |
| Isopentane | 18.1 |
| N-pentane | 4.5 |
| Branched hexanes | 14.5 |
| N-hexane | 3.9 |
| Heavier | 8.6 |
| | 100.0 |

The total conversion in this run was 96.1 per cent of the original normal hexane. The conditions for this run were more drastic than will usually be desired, since it is not usually desirable to produce such large proportions of propane. It is evident from this run, however, that at a somewhat lower temperature and/or a shorter reaction time high conversion of normal hexane to isobutane, isopentane, and isohexanes may be obtained. To produce neohexane drastic conversion conditions are especially effective, and recycling to the reaction zone of C4 and/or C5 hydrocarbons, and if desired hexanes and other paraffin fractions boiling somewhat above neohexane; these hydrocarbons result as side products under neohexane-producing conditions.

A fresh feed conversion stock primarily pentanes, as in Example I, or hexanes or a mixture is also suitable for neohexane production.

*Example IV*

Normal pentane was reconstructed in a series of continuous runs made in a reactor provided with a mechanically driven stirrer. The volumes of hydrocarbon and of catalyst in the reactor were approximately equal. The catalyst was hydrofluoric acid containing approximately 3 per cent by weight of boron fluoride. After a desired average contact or reaction time, the reaction mixture passed to a settler, from which the catalyst phase was recycled to the reactor and from which the hydrocarbon phase was removed for examination and analysis. Make-up hydrofluoric acid and/or boron fluoride were added during the runs. After each run, the reactor was inspected for the presence of sludge. The invention was practiced in runs 1 and 3 by saturating the ingoing normal pentane with water; data for runs 2 and 4, in which water was excluded (the pentane was dried with Drierite), are included for comparison.

| Run | 1 | 2 | 3 | 4 |
|---|---|---|---|---|
| Water (present or absent) | present | absent | present | absent |
| Temperature, °F | 169 | 165 | 167 | 167 |
| Pressure, p. s. i. | 350 | 500 | 350 | 350 |
| Contact time (avg.) min. | 20 | 25 | 30 | 11 |
| Catalyst Composition, weight per cent: | | | | |
| HF | 96.9 | 96.9 | 97.4 | 96.9 |
| BF$_3$ | 3.1 | 3.1 | 2.6 | 3.1 |
| Catalyst make-up, lb./gal. n-pentane charged: | | | | |
| HF | 0.27 | 0.20 | 0.0 | 0.17 |
| BF$_3$ | 0.06 | 0.05 | 0.04 | 0.065 |
| N-pentane reacted, per cent | 84 | 75.5 | 68.2 | 70 |
| Yield, weight per cent of n-pentane reacted: | | | | |
| Propane | 1.8 | 3.9 | 1.9 | 2.4 |
| Isobutane | 35.5 | 33.0 | 33.5 | 33.7 |
| N-butane | 8.8 | 7.7 | 7.9 | 6.4 |
| Isopentane | 22.5 | 27.0 | 26.2 | 28.0 |
| Branched hexanes | 17.4 | 16.6 | 17.3 | 17.5 |
| Heavier | 14.0 | 11.8 | 13.2 | 12.0 |
| Sludge formation | None | Much | Slight | Much |

*Example V*

Dimethylcyclopentane saturated with water was agitated for 47 minutes at 185° F. and 275 p. s. i. with approximately twice its volume of hydrofluoric acid containing 1.5 to 1.6 mol per cent of boron fluoride. The hydrocarbon phase then had the following composition, in per cent by weight:

| | |
|---|---|
| Propane and lighter | 7.4 |
| Isobutane | 15.4 |
| Isopentane | 5.2 |
| N-pentane | 2.7 |
| Hexanes | 3.3 |
| Dimethylcyclopentane | 3.8 |
| Intermediate-cyclic cut | 10.8 |
| Methylcyclohexane | 32.2 |
| Heavier | 19.2 |

No apparent sludge formation occurred.

*Example VI*

Normal hexane saturated with water was mixed with approximately its own volume of a mixture of hydrofluoric acid and approximately 3 per cent of boron fluoride in a 365-cc. continuous reactor having a 1750-R. P. M. stirrer rotating inside stationary blades. Make-up boron fluoride was added intermittently to replace that lost from the system or inactivated. The reaction mixture affluent from the reactor was cooled and allowed to settle into hydrocarbon and catalyst phases. The catalyst phase was recycled to the reactor, and the hydrocarbon phase was withdrawn for examination. Data for the run are:

| | |
|---|---|
| Temperature, °F | 176 |
| Pressure, p. s. i. | 450 |
| Contact time, min | 14 |
| Make-up BF$_3$, lb./gal. n-hexane reacted | 0.139 |
| N-hexane reacted, wt. percent | 35.2 |
| Yield, wt. percent of n-hexane reacted: | |
| Propane | 1.7 |
| Isobutane | 22.4 |
| N-butane | 2.6 |
| Isopentane | 22.6 |
| N-pentane | 2.7 |
| Branched hexanes | 23.8 |
| Heptanes and heavier | 24.2 |
| Sludge formation | None |

It will be appreciated that various modifications of my invention may be practiced without departing from the spirit of the disclosure and discussion or from the scope of the claims.

Comparison of the results of the batch run in Example II with those of the continuous run of Example VI indicates that formation of relatively light products in the batch run was suppressed by hydrogen liberated by corrosion of the steel pressure vessel.

I claim:

1. A catalyst consisting essentially of the product resulting from admixing liquid hydrogen fluoride, between about 0.1 and about 10 per cent by weight of boron trifluoride in excess of that molecularly equivalent to the water present, and water in an amount between about 0.05 and about 1.0 per cent by weight and less than that molecularly equivalent to the boron trifluoride present.

2. A liquid composition of matter consisting essentially of a product resulting from admixing liquid hydrogen fluoride, boron fluoride in excess of that molecularly equivalent to the water present in an amount between about 0.1 and about 5 per cent by weight of the total of hydrogen fluoride, water and boron trifluoride, and water in an amount between about 0.05 and 1 per cent by weight and less than that molecularly equivalent to the boron trifluoride present.

FREDERICK E. FREY.

REFERENCES CITED

The following references are of record in the file of this patent:

UNITED STATES PATENTS

| Number | Name | Date |
|---|---|---|
| 1,933,434 | Hoffman et al. | Oct. 31, 1933 |
| 2,283,142 | Ipatieff et al. | May 12, 1942 |
| 2,296,370 | Slotterbeck | Sept. 22, 1942 |
| 2,363,116 | Bruner | Nov. 21, 1944 |